2,622,919

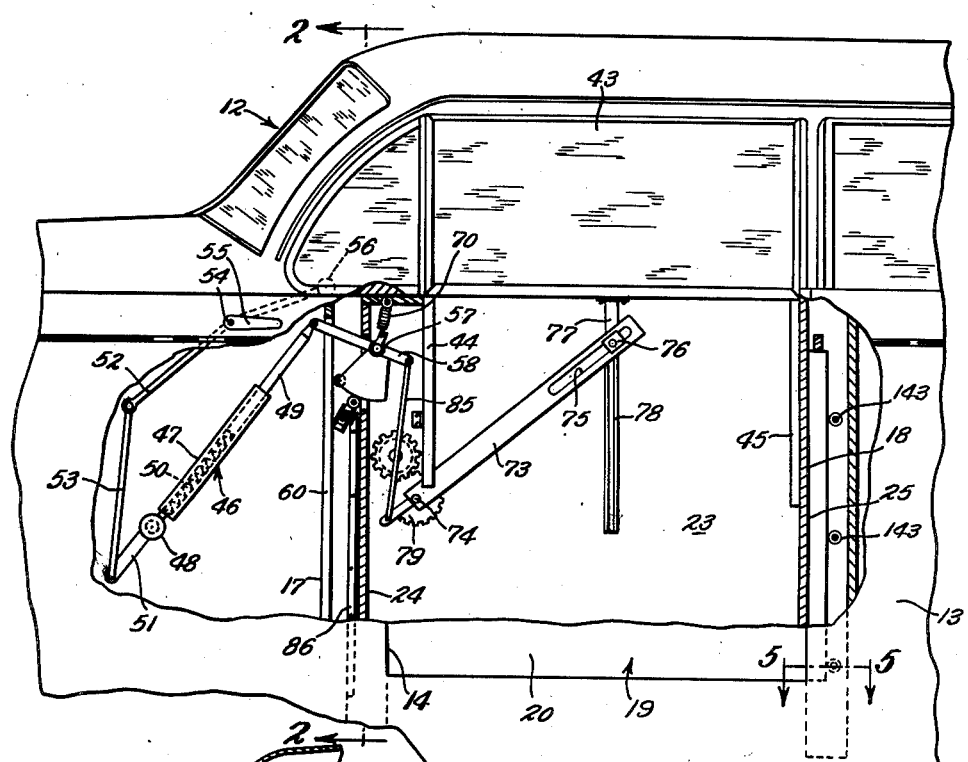
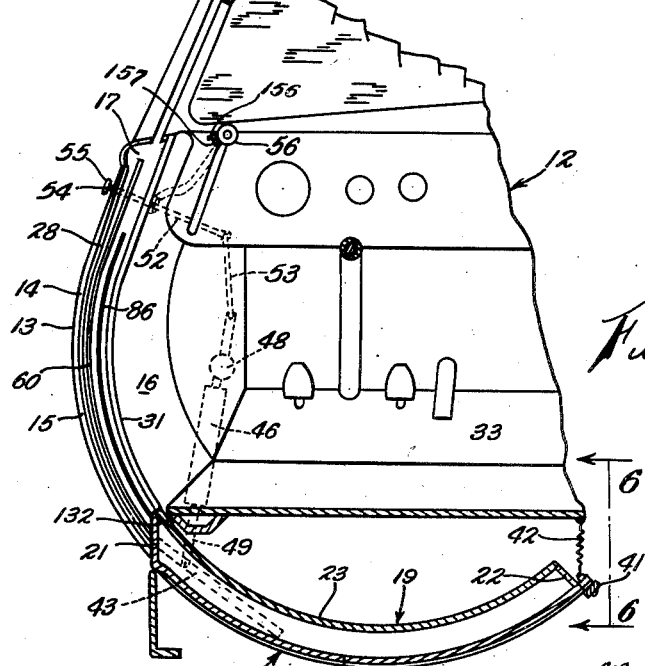

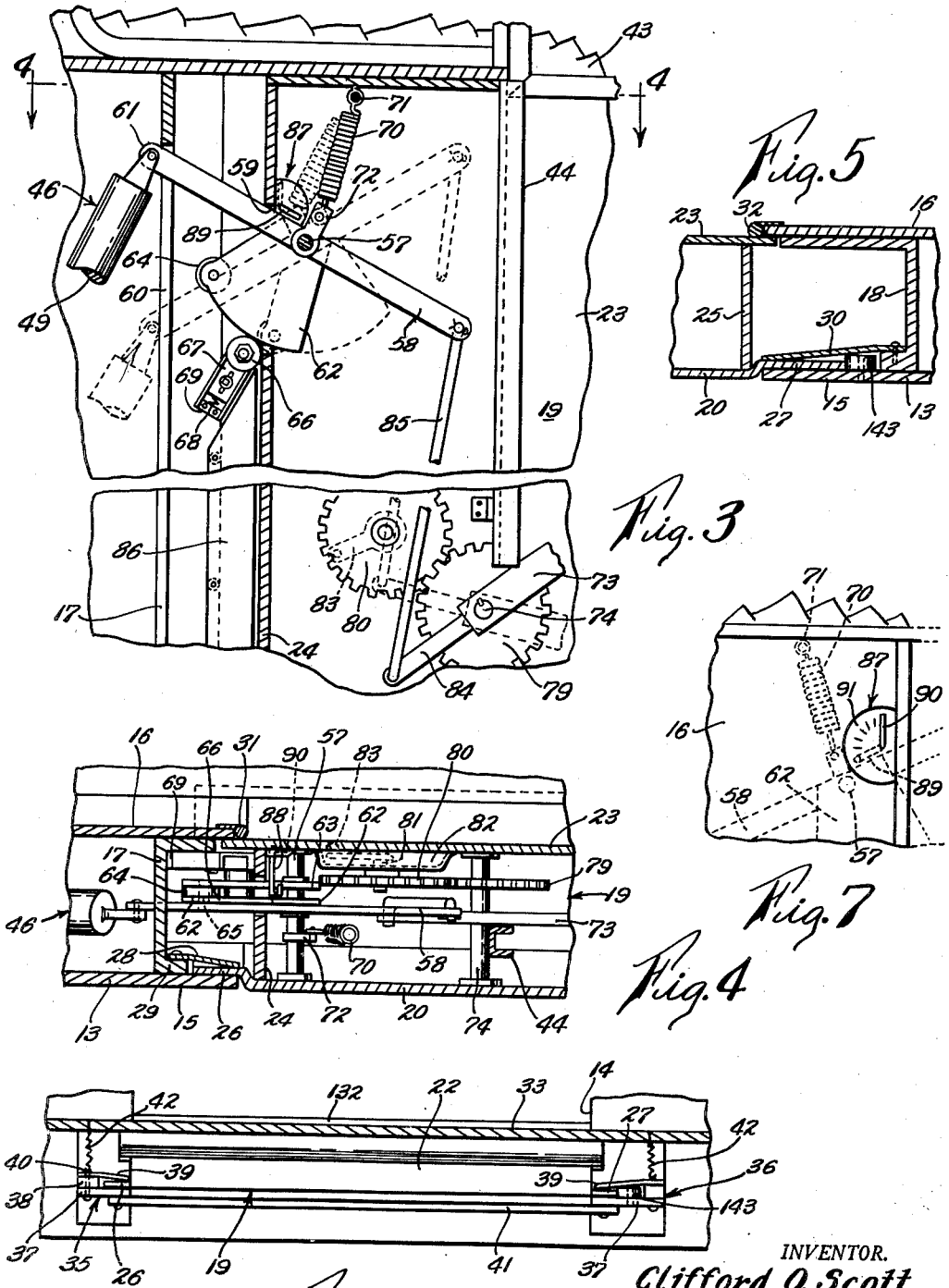
Dec. 23, 1952 — C. O. SCOTT — 2,622,919
VERTICALLY SLIDABLE VEHICLE DOOR
Filed March 14, 1949 — 2 SHEETS—SHEET 2
INVENTOR.
Clifford O. Scott Patented Dec. 23, 1952

UNITED STATES PATENT OFFICE 2,622,919

VERTICALLY SLIDABLE VEHICLE DOOR

Clifford O. Scott, Fort Mitchell, Ky.

Application March 14, 1949, Serial No. 81,328

11 Claims. (Cl. 296—44)

1

The present invention relates to improvements in the body constructions for vehicles and is particularly directed to a novel door for automobile bodies and means for operating it.

At the present time the entrance and exit doors for automobile bodies are hinged thereto for swinging movement about substantially vertical axes. Through the years automobile body design has moved from flat angular contours to curved streamline designs and the present automobile body has a wide low contour in cross-section with vertically curved sides which particularly lends itself to the features and functions of the sliding door of this invention.

It has long been a recognized fact in automobile body manufacture that hinged or swinging doors are hazardous in use because they swing open far beyond the vehicle body into the paths of oncoming vehicles, whilst said doors limit the storage capacity of parking garages and lots because of the additional space required between the cars so that said doors may be swung open. Other disadvantages of the present swinging door is the inability to open it when the vehicle is parked alongside of a relatively high curbing, or when the vehicle is resting upon a high crown in the road surface which causes the vehicle to assume a transversely inclined position relative to the curbing whereby, in either event, the door when swung open, will strike the curb and preclude exit from the door on the curb side of the vehicle.

It is therefore an object of this invention to provide an improved door for an automobile body which is guided for lateral movement within the confines of the automobile body when it is moved from its open or closed positions relative to the entrance and exit opening in said body.

Another object of the invention is to provide in an automobile body a door which may be moved edgewise beneath the body to an open, inoperative position for entrance to and exit from the interior of the body.

A further object of the invention is to provide an automobile body with a suitable hanger or door storing space positioned beneath the floor of the body subjacent the door opening and which is arranged to support the door whenever it is desirable to enter or leave the automobile body.

Another object of the invention is to provide an operating means for a door of the character described which automatically moves the window for the door within the door proper prior to movement of the door to its inoperative open position, and which also returns the door to closed position and then moves the window from the door to its extended, closed position within the door opening. The invention also contemplates the provision of a simplified control for the door and window operating mechanism which may be readily set in a selected position so that upon return of the door to closed position the parts will assume their respective preselected position.

Further objects of the invention are to provide for a door of the character described a means whereby its upper section is movable bodily into and enclosed by the lower section so that the door, so collapsed, may readily be moved to an open, inoperative position; to provide a door construction that can be made without the use of expensive door panel dies and their presses thereby facilitating body construction and materially reducing manufacturing costs.

These and other objects will be apparent from the following specification and accompanying drawings wherein:

Fig. 1 is a fragmental, side elevational view of a closed automobile body illustrating the preferred embodiment of my invention, and wherein the door is shown in its closed, operative position; some parts being broken away and other parts being shown in cross section.

Fig. 2 is a section taken on line 2—2 of Fig. 1 showing the automobile body door in open, inoperative position beneath the body.

Fig. 3 is an enlarged, fragmentary detail of the door and window operating mechanism as it is illustrated in Fig. 1.

Fig. 4 is a section taken on line 4—4 of Fig. 3.

Fig. 5 is an enlarged section taken on line 5—5 of Fig. 1.

Fig. 6 is an enlarged section taken on line 6—6 of Fig. 2, and

Fig. 7 is a plan view of the window preselector taken as it appears from within the automobile body.

In the drawings the numeral 12 indicates a closed automobile body having vertically curved side walls 13. One or both of the side walls may be provided with one or a plurality of openings 14 for entrance into or exit from the interior of the vehicle body. As most clearly illustrated in Figs. 2 and 4 the vehicle has an outer body plate 15 and an inner body plate 16 which may be spaced apart adjacent the forward vertical edge of the opening 14 by a body post in the form of a vertically disposed channel 17. The rearward edges of the outer and inner body plates defining the opening 14 (Fig. 5) may be spaced apart by a channel 18.

A door 19 is normally adapted to close the opening 14 in the body and as illustrated in Figs. 1 and 2 the door is transversely curved or otherwise shaped to conform to, and normally close the lower portion of the body opening. This door has an outer panel 20 which may be provided with inturned upper and lower flanges 21 and 22 which may have either or both of their inner ends extended to form a juncture with an inner door panel 23. To provide greater rigidity for the door a pair of spaced side plates 24 and 25 may extend between the outer and inner panels and be welded thereto as illustrated in Figs. 4 and 5 of the drawings. The forward and rearward edges of the outer panel 20 are inset from the major surface of said panel and are bent to form guide flanges 26 and 27 for receiving the adjacent edges of the outer body plate 15 on the forward and rear sides respectively of the door opening. The inner body plate 16 extends beyond the inner edges of the inner flanges of the channels 17 and 18 to form an overlapping interior seal for the door; the extending edges of the outer and inner body plates forming with the channels a curved door guide in the vertical edges of the body defining the opening therein.

The space between the forward edge of the body plate 15 describing the opening 14 and the guide flange 26 is sealed by a weather strip 28 which has one end secured by rivets, or the like, to a flange 29 of the channel 17 and has its free end in resilient engagement with the inner surface of the guide 26. The sliding connection between the rearward guide flange 27 and the plate 15 is sealed by a weather strip 30 (Fig. 5), which is fastened as by rivets to a flange of the channel 18 and has its free end in flexible engagement with the said guide. The inner body plate 16 carries sealing strips 31 and 32 along the forward and rearward vertical edges respectively of the body opening and a sealing strip 132 is carried along the outer edge of a floor 33 for precluding the entrance into the interior of the body of drafts that happen to pass through the exterior seals between the opening and the door, or from beneath the automobile body. It is contemplated that the upper part of the door may have a smaller overall thickness than the lower part thereof so that when the door is slid into its operative position closing the opening, the vertical edges thereof will be wedged into tight fitting relationship with the vertical guides and with the weather strips and sealing strips secured thereto.

The door is slidable bottomwise beneath the floor 33 of the body into a curved hanger indicated in the drawings by the reference numeral 34. This hanger has a pair of spaced tracks 35 and 36 for receiving the door guides 26 and 27 respectively. The tracks 35 and 36 are a continuation or an extension of the respective vertical guides for 26 and 27 of the door opening 14 and each of the tracks has a flexible strip 37 which may, if desired, be an extension of the exterior body plate 15 or may be separately constructed from a suitable flexible material. A spacer 38 is disposed along the outer edge of the strip 37 and carries on its upper surface a suitable sealing strip 39, said strips and the spacer being joined together throughout their lengths by any suitable fastening means such as rivets 40. In order that the tracks 35 and 36 may be held in fixed spaced relation, one with the other, the inner ends may be joined by a cross bar 41. Furthermore, it would be desirable that the inner ends of the tracks be held in an elevated position in as close proximity to the floor 33 as possible when the door is closed. To that end there may be provided a flexible suspension device, such as springs 42 which may be anchored at one of their ends to the floor and attached at their other ends to the tracks 35 and 36 or to the bar 41.

Fluidity of design can be had by the elimination of portions of guides 26 and 27 on the doors allowing the center portion to conform to almost any conceivable lines the designer might care to use without departing from the spirit of this invention; it also being conceivable that in the interest of economy a manufacturer might care to delete the end plates allowing the upper or lower edges of the door to flex or otherwise follow body lines not arcuately a true curve. In this case the inner panel would have to be allowed a slight vertical movement at one end, a result not dissimilar to a book of paper matches with the covers being the inner and outer panels.

A window 43 is adapted to normally close the upper portion of the body opening and is slidable edgewise into the upper part of the door on a pair of spaced vertical tracks 44 and 45 mounted within the confines of the door. It will therefore be noted that the door 20 is adapted to normally close the lower portion of the opening 14 and that the window 43, slidable within the upper part of the door, is adapted to normally close the portion of the door opening between the upper edge of the door and the upper extremity of said door opening. Because of the curved contour of the body and the conformation of the door to the body contour, the door may be moved downwardly into the curved hanger 34 disposed beneath the floor of the body for the purpose of entrance or exit from the body interior.

With reference to Fig. 1 it will be noted that my door actuating mechanism is disposed to one side of the door and within the confines of the body. To provide free sliding action for the door a series of rollers 143 are positioned adjacent the rearward edge of the body opening and as indicated in Fig. 5 may be journaled on shafts secured to the interior face of the outer body plate 15. The series of rollers is continued across the hanger track 36 and it will be noted that the door is continuously urged rearwardly by the door actuating mechanism so that the edge of the guide flange 27 of the door bears against and has almost frictionless contact with the series of rollers during operation of the door by the mechanism. The door actuating mechanism consists of a spring loaded extensible arm 46 pivotally mounted for oscillating movement on the body and which functions in opening and closing the door like a load and fire mechanism. The arm comprises a tubular member 47 mounted at one end to the body upon a universal ball and socket joint 48 and having movable in its opposed end a plunger 49 which is urged outwardly by a compression spring 50 positioned within the tubular member. The tubular member has fixed to its pivoted end an arm 51, said arm being connected to a lever 52 by a loosely pivoted link 53. The lever 52 is fixed on a shaft 54 which freely passes through the body and has fixed to its outer end a handle 55, whilst its inner end has fixed thereto a handle 56. The handle 56 may be locked in its closed position illustrated in Fig. 2 and to this end a pin 156 may be projected from the handle portion and engage over a stop pin 157 fixed in the dash board of the vehicle.

Pivotally mounted within the upper corner of the door and fixed upon a rotatable cross shaft 57 is a latch lever 58 which has its forward arm extending through an opening 59 in the side plate 24 and through a vertical slot 60 in the channel 17 with its extremity 61 pivotally secured to the outer free end of the plunger 49. The shaft 57 has secured to it a lost-motion cam latch 62 which is in alignment with an identical cam 63 fixed to the shaft 57, said cams carrying between them a wheel 64 rotatably mounted on a crosspin 65 anchored at its ends in the plates. When the door 20 is in its closed position the cams engage a latch wheel 66 carried by a movable block 67 constantly urged toward the cams by a spring 68 disposed between the block and a fixed stop 69 secured to the channel 17. An overcenter spring device 70 is pivotally mounted at one of its ends 71 to the body and has its free end pivotally connected to an arm 72 fixed on the shaft 57.

The window 43 is supported upon an arm 73 fixed to a cross shaft 74 in turn rigidly mounted between the door panels 20 and 23. The outer end of the arm has an elongated slot 75 for slidably receiving a block 76 pivotally mounted to the lower end of a window support member 77. The block may be suitably guided for vertical movement in a track 78 fixed to the inner panel 23 of the door. The window is raised or lowered in the usual manner by a window regulator which comprises a gear 79 fixed to the shaft 74 which meshes with a gear 80 mounted on a shaft 81 in turn rotatably mounted in an inset portion 82 formed in the inner panel 23. The inset portion is preferably round and has disposed therein a handle 83 which is fixed to the shaft 81. The handle 83 is thereby disposed within the confines of the door panel 23 so that when said door slides beneath the body said handle will clear the edge of the floor adjacent the door opening. As is most clearly illustrated in Fig. 3 the arm 73 has an extension 84 which is operatively connected to the rearward extremity of the lever 58 by a link 85.

When the door mechanism is moved to its dotted line position illustrated in Fig. 3 said mechanism is in position to permit sliding movement of the door toward its open, inoperative position, and to maintain said mechanism in said position during opening and closing movement of the door a rub rail 86 is provided that extends along the forward door guide and is in position to contact the wheel 64 after the wheel is moved away from the latch wheel 66.

With reference to Figs. 3, 4 and 7 there is shown a preselector 87 which comprises a shaft 88 rotatably mounted in the door panel 23 and having a cam arm 89 on its inner end for engaging the cam 63 and limiting its clockwise movement as it is illustrated in Fig. 3. The outer end of the shaft is turned at right angles to form an operating lever 90 which is positioned in an inset portion 91 formed in the door panel.

In operation it will be noted that the window 43 may be raised or lowered to a selected position by operating the window regulator. To do this the handle 83 is grasped and turned either clockwise or counterclockwise until the arm 73 has been pivoted to a position to support the window in the position selected by the operator. Operation of the window regulator gears also moves the arm 84 which is operatively connected to the latch lever 58 by link 85. Thus when the window is moved to a selected position in the body opening the latch lever 58 is rotated in either direction which will cause the lost-motion portions of the cams to rotate against the latch wheel 66 whereby the latch will maintain the door in its closed and latched position. It will also be noted that rotation of the latch lever in one direction will compress the extensible arm, and to offset the additional force exerted by the arm against the lever as it moves in said direction, the compression spring 70 is adapted to move overcenter so that its force is directed to counterbalance the force of the spring 50 in the extensible arm and provide easy operation of the window by means of the regulator mechanism.

When it is desired to open the door either from the inside or the outside the handles 55 and/or 56 respectively may be grasped and turned thereby rotating the extensible arm about its pivotal mounting 48. Initial movement of the extensible arm will cause rotation of the cam latches 62 and 63 until they are in the position illustrated in dotted lines in Fig. 3 wherein the window 43 has been moved within the confines of the door by link 85 and window operating arm 73. Further downward movement of the door will cause the wheel 64 to engage and roll on the rub rail 86 and prevent openings of the window during the opening movement of the door which is accomplished by turning the handle to its limit of motion.

To close the door either handle 55 or 56 is grasped and rotated in the opposite direction whereby the door will rise into the opening and as it assumes its normal closed position further rotation of the handle will cause the latch to engage the latch wheel and then be moved by the extensible arm into the position illustrated in full lines in Fig. 3. The preselector may be manually moved until the cam arm 89 contacts the cam 62 in a position assumed by it upon operation of the window regulator, and upon return of the door to its closed position the window instead of being moved to its fully closed position can be held fully opened, or will be stopped at the preselected position by contact of the cam arm 89 with the cam 62.

What is claimed is:

1. A motor vehicle including a body having an opening formed through at least one of its vertically curved side walls for entrance to and exit from the interior of said body, a door closing the opening and slidable edgewise to a position beneath the body, a spring loaded, extensible arm pivotally mounted on, and within the confines of the body and having its pivotal mounting disposed on one side of the opening, pivot means operatively connecting the free end of the arm to the upper portion of the door, and means mounted on the body for actuating the arm to open and close the door.

2. A motor vehicle including a body having an opening formed through at least one of its vertically curved side walls for entrance and exit from the interior thereof, a door closing the opening and slidable edgewise beneath the body, a latch means pivoted on the upper portion of the door and adapted to engage the body to close the door, a spring loaded, extensible arm mounted for oscillating movement on, and within the confines of the body and having its pivotal mounting disposed to one side of, and intermediate the upper and lower ends of the door, pivot means for connecting the free end of the arm to the latch means, and lever operated means mounted on the body for actuating the arm to open and close the door.

3. In a vehicle body having an opening therein for entrance to and exit therefrom, the combination of a door hanger positioned beneath the body in alignment with the opening, a door closing the lower portion of the opening and slidable bottomwise into the hanger, a window mounted within the door for edgewise movement beyond its upper edge, window regulating means within the door for normally adjusting the window to selected positions within the upper portion of said opening, a latch within the door, means for operatively associating the movement of the latch with the window regulating means, an extensible arm mounted for rocking movement within the body and having an operative connection with the latch, and means mounted on the body for rocking the arm.

4. In a vehicle body having vertically curved side walls and an opening formed through one wall for entrance to and exit from the interior of said body, the combination of a curved door hanger positioned beneath the body in alignment with the opening, a curved track formed in each vertical edge of the side wall defining the opening and each track having a curved portion extending across the hanger, a door curved with respect to the horizontal axis of the body and adapted to normally close the lower portion of the body opening, guides on the edges of the door slidable in the tracks for directing the door bottomwise to an inoperative position in the hanger, a window mounted within the door for edgewise movement beyond the upper edge of the door, window regulating means within the door for normal adjustment of the window into selected positions within the upper portion of said opening, a cam latch mounted for oscillating movement within the door, an operative connection between the cam and the window regulator, an extensible arm disposed within the confines of the body, a universal joint mounting one end of the arm to the body, an operable connection between the opposed end of the arm and the cam, and means mounted on the body for actuating the arm.

5. In a vehicle body having vertically curved side walls and an opening formed through at least one wall for entrance to and exit from the interior of said body, the combination of a curved door hanger positioned beneath the body in alignment with the opening, a curved track formed in each vertical edge of the side wall defining the opening, each track having a curved extension constituting side members for the hanger, a door curved with respect to the horizontal axis of the body and adapted to normally close the lower portion of the body opening, guides on the edges of the door slidable in the tracks for directing the door bottomwise to an inoperative position in the hanger, a window mounted within the door for edgewise movement beyond the upper edge of the door, window regulating means within the door for normal adjustment of the window into selected positions within the upper portion of said opening, a lost-motion cam latch pivotally mounted within the door, a latch wheel mounted on the body for normally engaging the lost-motion cam to maintain the door in closed position, an operative connection between the cam and the window regulating means, a spring loaded, extensible arm mounted within the confines of the body, means for operatively connecting the extensible arm to the cam to first move the window into the door, disconnect the latch, and then move the door to inoperative, open position, and means for actuating the arm.

6. In a vehicle body having vertically curved side walls and an opening formed through at least one wall for entrance to and exit from the interior of said body, the combination of a curved door hanger positioned beneath the body in alignment with the opening, a curved track formed in each vertical edge of the side wall defining the opening, each track having a curved extension constituting side members for the hanger, a door curved with respect to the horizontal axis of the body and adapted to normally close the lower portion of the body opening, guides on the edges of the door slidable in the tracks for directing the door bottomwise to an inoperative, open position in the hanger, a window mounted within the door for edgewise movement beyond the upper edge of the door, window regulating means within the door for normal adjustment of the window into selected positions within the upper portion of said opening, a lost-motion cam latch pivotally mounted within the door, a latch wheel mounted on the body for normally engaging the lost-motion cam to maintain the door in closed position, an operative connection between the cam and the window regulating means, a preselector associated with the cam for precluding movement of the window upwardly beyond the selected position, a spring loaded, extensible arm mounted within the confines of the body, means for operatively connecting the extensible arm to the cam to first move the window into the door, disconnect the latch, and then move the door to inoperative, open position, and means for actuating the arm.

7. In a motor vehicle body having an opening therein for entrance to and exit therefrom, the combination of a door closing the lower portion of the said opening and slidable bottomwise to a position beneath the body, a window mounted within the door for topwise movement beyond the upper edge of the door, window regulating means within the door for normally adjusting the window to selected positions within the upper portion of said body opening, a lost motion latch within the door for maintaining the door in closed position within the opening, means for operatively connecting the latch to the window regulating means, the connection being such that movement of the window into preselected positions in the upper portion of the body opening is co-ordinated with the lost motion of the door latch, a door operating, extensible arm pivoted within the body and having an operable connection with the latch, and means mounted on the body for rocking the arm to open and close the door.

8. In a motor vehicle body having an opening therein for entrance to an exit therefrom, the combination of a door closing the lower portion of the opening and slidable endwise beneath the body, a window mounted within the door for endwise sliding movement beyond the upper edge of the door, a window regulator within the door for adjusting the window to selected positions within the upper portion of the body opening, a keeper on the body beside the door opening, a lost motion latch pivoted in the door and having a rotating connection with the keeper, means for connecting the lost motion latch to the window regulator to co-ordinate the window raising and lowering action of the regulator with the lost motion connection between the latch and keeper, an extensible arm pivoted within the body and having an operable connection with the lost motion latch, biasing means for the extensible arm providing a thrust for the arm sufficient for it to normally move the latch, the regulator and the window into window closed positions, manually controlled operating means mounted on the body for rocking the arm for opening and closing the door, and a preselector means mounted on the door adjacent the latch for limiting the movement of the latch toward window closed position.

9. In a motor vehicle body having an opening therein for entrance to and exit therefrom, the combination of a door closing the lower portion of the opening and slidable endwise beneath the body, a window mounted within the door for endwise sliding movement beyond the upper edge of the door, a window regulator within the door for adjusting the window to selected positions within the upper portion of the body opening, a keeper on the body beside the door opening, a lost motion latch pivoted in the door and having a rotating connection with the keeper, means for connecting the lost motion latch to the window regulator to co-ordinate the window raising and lowering action of the regulator with the lost motion connection between the latch and keeper, an extensible arm pivoted within the body and having an operable connection with the lost motion latch, biasing means for the extensible arm providing a thrust for the arm sufficient for it to normally move the latch, the regulator and the window into window closed positions, manually controlled operating means mounted on the body for rocking the arm for opening and closing the door, and a preselector means mounted on the door adjacent the latch for limiting the movement of the latch toward window closed position.

10. In a motor vehicle body as set forth in claim 9 characterized by the fact that the extensible arm has its pivotal mounting located on one side of the door opening and between the longitudinal center line and the lower edge portion of the said door opening.

11. In a motor vehicle as set forth in claim 10 further characterized by the fact that a latch rub rail is positioned on the body to one side of the opening therein and subjacent the keeper.

CLIFFORD O. SCOTT.

REFERENCES CITED

The following references are of record in the file of this patent:

UNITED STATES PATENTS

| Number | Name | Date |
| --- | --- | --- |
| 1,131,322 | Bower | Mar. 9, 1915 |
| 1,143,062 | Olafson | June 15, 1915 |
| 1,193,707 | Masury | Aug. 8, 1916 |
| 1,589,336 | Schoenen | June 15, 1926 |
| 2,029,050 | Birge | Jan. 28, 1936 |
| 2,072,310 | McMullen | Mar. 2, 1937 |
| 2,214,722 | De Seversky | Sept. 10, 1940 |
| 2,519,386 | Loving | Aug. 22, 1950 |

FOREIGN PATENTS

| Number | Country | Date |
| --- | --- | --- |
| 225,087 | Switzerland | Apr. 1, 1943 |
| 245,807 | Great Britain | July 8, 1926 |